United States Patent
Ponticelli et al.

(10) Patent No.: US 6,845,500 B2
(45) Date of Patent: Jan. 18, 2005

(54) PARADIGM FOR SERVER-SIDE DYNAMIC CLIENT CODE GENERATION

(75) Inventors: Salvador Ponticelli, Caracus (VE); Paul Babic, Caracus (VE)

(73) Assignee: Smartmatic Corporation, Boca Raton ( * ) Notice: Subject to any disclaimer, the term of this patent is extended or adjusted under 35 U.S.C. 154(b) by 225 days.

(21) Appl. No.: 09/682,082

(22) Filed: Jul. 17, 2001

(65) Prior Publication Data

US 2003/0018954 A1 Jan. 23, 2003

(51) Int. Cl.[7] .................................................. G06F 9/44
(52) U.S. Cl. ........................ 717/107; 717/109; 717/113
(58) Field of Search .................. 717/104–117, 120–123, 717/125; 709/328–330; 345/760–763

(56) References Cited

U.S. PATENT DOCUMENTS 6,212,536 B1 * 4/2001 Klassen et al. ............. 715/513
6,526,524 B1 * 2/2003 Kelley .......................... 714/38
6,560,639 B1 * 5/2003 Dan et al. .................... 709/218

OTHER PUBLICATIONS

Lewandowski, "Frameworks for component–based client/server computing", ACM, pp.: 3–27, Mar. 1998.*

Candan et al., "Enabling Dynamic Content Caching for Database–Driven Web Sites", ACM, pp.: 532–543, May 2001.*

* cited by examiner

*Primary Examiner*—Tuan Dam
*Assistant Examiner*—Ted T. Vo
(74) *Attorney, Agent, or Firm*—Jeffrey Furr

(57) ABSTRACT

The present invention discloses a novel model for dynamic server-side generation of computer program code which can be executed at the client machine.

4 Claims, 5 Drawing Sheets

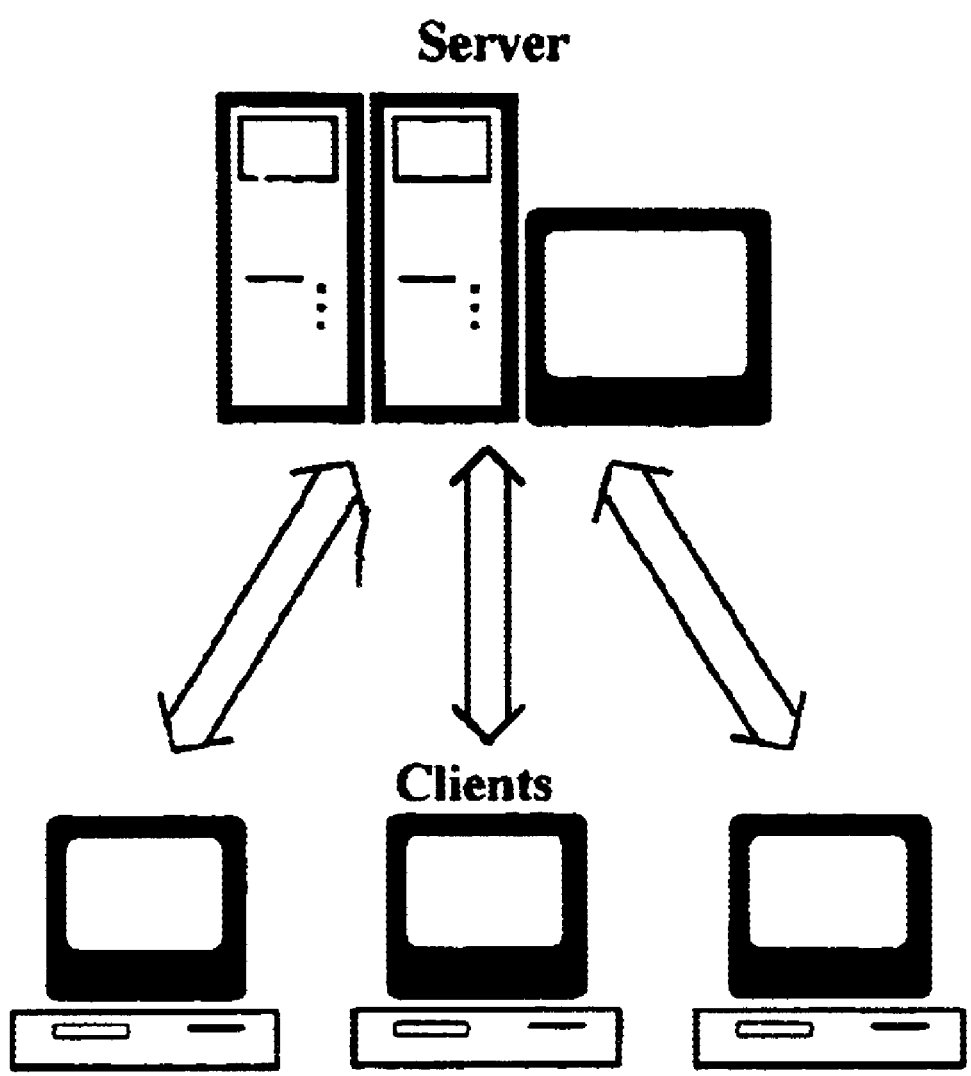

Building Automation Application

MAASA Model

PARADIGM FOR SERVER-SIDE DYNAMIC CLIENT CODE GENERATION

BACKGROUND OF INVENTION

Backgroundrelated Applications

Not Applicable

Background Field of Invention

This invention relates to the field of dynamic computer program code generation, specifically to server-side dynamic and automatic generation of computer program code in response to a client computer"s request.

Background Discussion of Prior Art

The server/client computer architecture is a fundamental enabling approach that provides the most flexible framework for using new technologies, such as the World Wide Web. The old paradigm of time-shared and host-centric computing has given way to a new server/client approach that is message based and modular.

Several existing server/client architectures are based on interaction in which the client generates data requests to the server, and the server, in response, replies by providing needed data, etc. This is the case, for example, of traditional static HyperText Markup Language systems in which the client posts HTTP data requests and the server replies with static HTML files. Several other server/client architectures are based on interaction in which the client generates requests to the server, and the server, in response, replies by providing static and predefined computer code which the client executes to generate its needed data or functionality. An example of this is a server which provides predefined HTML and JavaScript code. When the client posts a request, it receives both HTML code and JavaScript code, the latter being executed at the client to generate HTML code.

There are, still, several other server/client instances in which the client request comprises code which the server must execute. The results of this execution is data or code that is transferred to the client for display or execution, respectively. This is the case with Active Server Pages, through which HTML and JavaScript code is generated. Lately, new technologies have been introduced, such as Dynamic HTML (DHTML) in an attempt to expand the dynamic characteristics of traditional HTML code.

All these approaches can be classified as either server-side or client-side, implying that requests are fulfilled by executing code either at the server or at the client, respectively. Hence, all these approaches only provide certain degree of flexibility. A hybrid approach, however, in which code is executed at both the server and client sides results in higher complexity systems which, when properly implemented, can significantly expand the capabilities of a server/client application system.

Furthermore, an approach in which a server can generate client code dynamically to meet a specific client"s requirements is strongly needed, and no currently known method achieves this with success. In all existing methods, the code and its entire functionality must be predefined.

In the highly-varying and customizable future of server/client based applications and systems, especially in web-based applications and systems, there is the need to dynamically create client-executable or client-interpreted code specific to every client that posts a request to the server, which requires a hybrid server-side and client-side approach to dynamic code generation. Currently, there are no available methods that fulfill this requirement.

It is also desirable that application implementation details be abstracted from the actual application structure and functionality. This requires that application functionality and structure be defined outside of the actual application, and that an intelligent application building agent be used to transform defined application structure and functionality into an implemented application targeting specific clients. Currently, there are no available models that fulfill this requirement.

Thus, it the purpose of this patent to disclose a comprehensive model for software abstraction which allows server-side dynamic generation of client-side applications.

SUMMARY OF INVENTION

The present invention discloses a novel model for dynamic server-side generation of computer program code which can be executed at the client machine.

OBJECTS AND ADVANTAGES

Accordingly, several objects and advantages of the present invention are: a) to provide a novel method that allows the creation of more flexible server/client applications; b) to provide a flexible method that implements a hybrid approach to server/client interaction in which an application may involve that computer program code be executed at both server and client computers; c) to provide an intelligent method that implements on-the-fly generation of client-executable or -interpretable code at the server that allows for dynamic, run-time creation of applications based on an application description repository; d) to provide a thorough model that implements and utilizes an unprecedented approach to application description, namely, an application descriptor repository, which stores all information concerning structure and operation of an application, and which may be used as a reference infrastructure for the construction of complete applications on-demand.

Other objects and advantages of this invention will become apparent from a consideration of the ensuing description and drawings.

BRIEF DESCRIPTION OF DRAWINGS

In the drawings, closely related figures have the same number but different alphabetic suffixes.

FIG. 1 illustrates a typical server/client architecture configuration.

LIST OF REFERENCE NUMERALS IN DRAWINGS

Figure 2A:
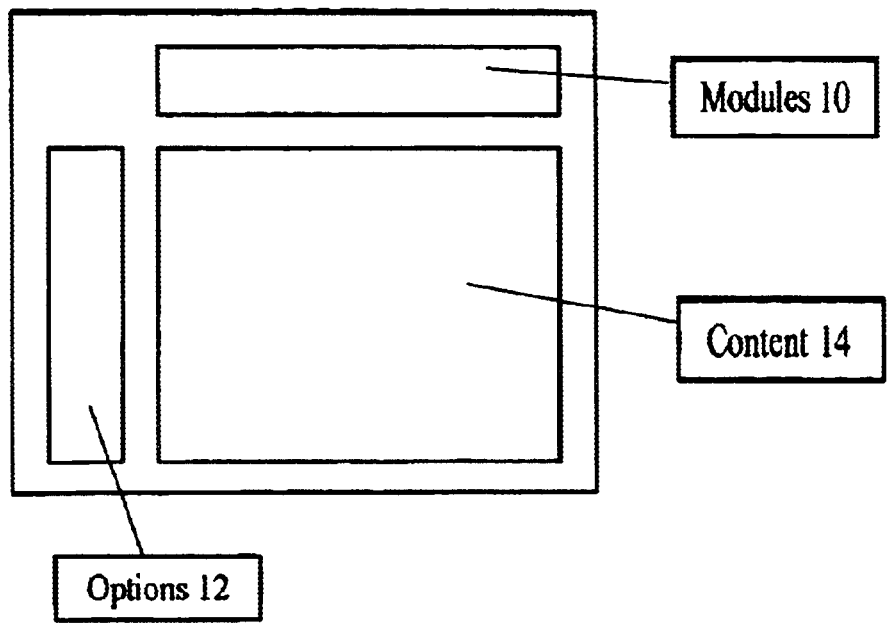
FIG. 2A illustrates a typical application using the present invention.

10 Generic application modules.

12 Generic application options.

14 Generic application content.

16 Building Automation application exemplary modules.

18 Building Automation application exemplary options.

20 Building Automation application exemplary content.

30 Application Building Engine (ABE)32 Application Descriptor Repository (ADR)34 Application Descriptor Interface (ADI)36 Application Implementation Reference Interface (AIRI)38 Application Implementation Reference Repository (AIRR)

DETAILED DESCRIPTION

Now, the present invention will be described by referring to the accompanying drawings that illustrate preferred embodiments of the invention.

FIG. 1 illustrates a typical client/server architecture configuration, in which several clients may connect to one or more servers. Client/server architectures are flexible and modular, can be changed and upgraded, and can evolve in several ways. Client/server architectures are the logical extension of modular programming. Modular programming, in essence, states that applications may be divided into several working parts or modules to increase ease of development and maintainability. Client/server architectures further extend this concept stating that these modules do not necessarily have to reside and be executed within the same memory space. Rather, the processing load can be distributed across several hosts. Hence, a client is, by definition, a host that requests a service and a server is a host that provides the service.

Let there be a system in which one of several client hosts (i.e., clients) may interconnect with one of several server hosts (i.e., servers). The client may perform service requests to the server to which the server may respond by providing the service. For example, the client may request access to a specific static HTML file that is stored at the server. The server, thus, responds by transferring said file to the client, so that the client may display it.

The instance in which a client performs a static data request, i.e., a request that results in static data transfers from server to client, is probably the simplest example of server/client interaction. In the past several years, there have been developments in server/client systems that allow more complex server/client interaction. Among these are:

The client performs a request to the server which causes the server to carry out the execution of certain instructions or commands. This code, for example, may be contained in an Active Server Page (ASP) file comprising Visual Basic Script (VBScript) instructions. When the client makes a request for a specific ASP file, the file is processed (which may imply database queries, etc), and the result (i.e., usually static HTML code) is transferred back to the client for display.

The client performs a request to the server which causes the server to perform as above. Next, the HTML code transferred back to the client contains embedded executable code, such as JavaScript or VBScript, which may be executed under some instances. Typical uses of such code include the behavior of the client when certain controls included in the page are activated (e.g., button controls, mouseovers, etc). The code executed at the server generates data which is transferred to the client (e.g., HTML code that is transferred to the client for display purposes).

This invention presents a more comprehensive model for client/server architectures that allows more dynamic interaction and flexibility. The application infrastructure is based on OLE_LINK1 the Multidimensional Advanced Adaptive Software Architecture OLE_LINK1 described in our copending application. A typical application as defined by this invention is portrayed in FIG. 2A. Every application is, preferably, organized in a hierarchical structure, which results in a more user-friendly and organized interface. The application of FIG. 2A comprises three main sections, which subdivide the application into several layers of functionality: the Modules section, the Options section and the Content section. Next, each of these is described in detail.

The Modules section includes all mutually-exclusive structural and functional components of the application, fundamentally separating all high-level functionality into different blocks. Mutual-exclusiveness is desirable to avoid redundancy in functionality which may result in unnecessarily large or complex applications. In an exemplary application for building automation, the Modules section may include blocks such as Access Control, Lighting and an Alarm System, among others.

The Options section includes all options which implement the fundamental functionality of every module. In a building automation application, the Access Control Module may comprise a set of options, such as Administration and Configuration, among others. Each option in the Options section, if need be, may be subdivided into several suboptions depending on how extensive the application is. For instance, the Administration option may contain several suboptions, such as an User and Visitor Control and an Access Card Database, among others.

In the preferred embodiment of this invention, each option or suboption, as applicable, presents a frame of content which is called the Content section. The Content section comprises all actual functionality of the application in its most basic form. It contains a set of controls or information, as needed, that a user may fill-in, alter and/or delete to consequently modify the operation of the application. In the building automation example, a User Control option may contain a frame which display text boxes corresponding to a user"s name and location in the building, which may be used to query a User Database for existing users or to enter new users into the User Access Database.

Figure 2B:
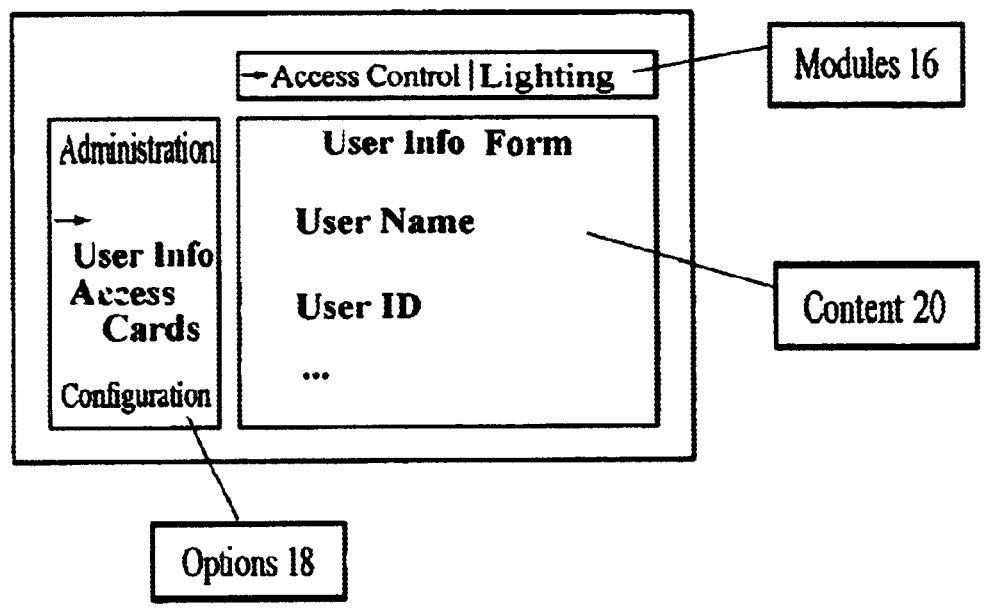
FIG. 2B illustrates a view of an exemplary building automation application.

FIG. 2B illustrates an view of an exemplary building automation application. The shown application consists of two modules (i.e., Access Control and Lighting). The selected Access Control Module contains two main options (i.e., Administration and Configuration). The selected Administration option contains two suboptions (i.e., User Info and Access Cards). The selected User Info suboption displays the User Info Form on the Content section.

Figure 3:
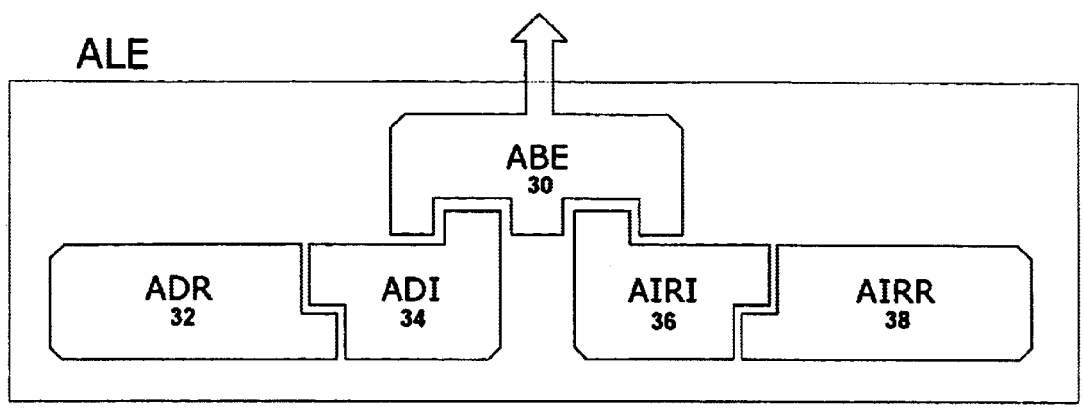
FIG. 3 illustrates the structure of the Application Logic Engine.

Behind the visible parts of the application, specifically behind its graphical user interface, lies the Application Logic Engine (ALE) which comprises the most fundamental element in the operation of this method. The structure of the Application Logic Engine is illustrated in FIG. 3. The Application Logic Engine is the essential block for dynamic application construction and contains three basic interconnected components, namely, the Application Building Engine, the Application Descriptor Repository, the Application Implementation Reference Interface and the Application Implementation Reference Repository. These are described next.

The Application Building Engine (ABE) functions as the core arbiter that directs the on-the-fly construction of applications and serves as link between all ALE modules and other parts of the system. It controls the entire process of application construction by intercommunicating with other ALE modules, if needed (see below).

The Application Descriptor Repository (ADR) is a data repository (e.g., implemented as a database) containing all details concerning the design of an application. Specifically, it contains details about application structure, including its modules, options, suboptions and content. In the example of FIG. 2B, the ADR contains all modules (i.e., Access Control, Lighting), options (i.e., Administration and Configuration, plus the options contained under the Lighting module), suboptions (i.e., User Info and Access Cards, plus those suboptions contained under the Configuration option) and the Content associated with every suboption. In other words, the ADR contains comprehensive information about an application"s hierarchical structure and functionality, and how each module may be modified. For example, the ADR knows that the User Info suboption contains several information fields, including text boxes for user name and ID, etc.

The Application Descriptor Interface (ADI) interconnects the ABE and the ADR and acts as an interface between them. Its main responsibility is to operate as an abstraction layer between the ADR and the ABE to ensure that one same ABE may use several different ADRs. That is, one same ABE may be used regardless of the ADR in use, and when changes are made to the ADR, no changes to the ABE are required.

The Application Implementation Reference Repository (AIRR) is another data repository (e.g., implemented as a repository database) that contains all client-specific implementation details of an application. Several different clients using dissimilar or incompatible computer platforms require that one same application be built in several different ways. The AIRR"s responsibility is to store all required platform-specific implementation details that may be needed to construct applications destined to different clients, and to supply them when these are requested.

The Application Implementation Reference Interface (AIRI) interconnects the AIRR and ABE and operates as interface between them. Its main duty is to act as an abstraction layer so that several AIRR components (e.g., corresponding to several different platform-specific implementations or combinations thereof) may be plugged into an ABE without requiring any modifications to the ABE.

The ALE model also comprises an ALE Interconnection Pipe (ALEIP) which interconnects several ALE running concurrently in the same server (see operation below).

As stated above, the simple and modular structure of the ALE allows for component interchangeability, thus, allowing ready changes (i.e., modifications and upgrades) to the used ADRs without requiring modifications to the ABE. Likewise, depending on the platform of the client where the application is to be executed (i.e., the target client platform) several dissimilar AIRRs may be exchanged, modified or upgraded without requiring modifications to the ABE.

OPERATION OF INVENTION

Now, the operation of the present invention will be described by referring to the accompanying drawings that illustrate preferred embodiments of the invention.

The fundamental object of the present invention is to disclose a comprehensive infrastructure to implement server-side, dynamic, on-the-fly creation of customized applications in response to client requests.

The basic operation is as follows. A client posts one or more requests to a server asking for a specific service. The request is received and examined at the server. Next, the server passes the request to the Application Logic Engine process running on it. Inside the server"s Application Logic Engine, the request is received by the server"s Application Building Engine, which is responsible for the coordination of the application building process.

The request that reaches the ALE contains two essential pieces of information: the identifier of the requested application and the associated client-specific implementation details. The application identifier refers to a number that lets the ALE know which service is being requested by the client. Client-specific implementation details refer to the manner in which the client requires that the application be implemented. For example, the client may be an HTML browser that requires that the application be generated using static HTML code; or that the application be created by server-generated executable code that, when executed on the requesting client, outputs dynamic HTML code, or other code, that implements the application.

Thus, when the ABE receives the request it communicates with the ADR through the ADI to retrieve all application structure details from the repository. These may include, but are not limited to, the application structure including modules, options and suboptions, hierarchically organized as described above. The ADI delivers all retrieved application structure information to the ABE. The ADR also contains every functionality detail contained in each suboption, including the implemented functions and controls. In the example of FIG. 2B, retrieved ADR information includes the titles of modules, options and suboptions (e.g., Access Control, Administration, User Info, etc), and the buttons, text fields and other controls displayed in every suboption (e.g., User Name, User ID, etc).

Next, once all logic functionality descriptors that need to be implemented have been retrieved from the ADR, and having exact knowledge of the platform and environment in which the client will execute the requested application, the ABE communicates with the AIRR through the AIRI to retrieve stored platform-dependent information that implements the required functionality. Specifically, depending on the client environment in which the application is to be executed, and depending on the implementation parameters specified by the client in the posted service request, the AIRI retrieves actual implementation program code from the AIRR and delivers it to the ABE.

A common, but limited, example of this are web-based applications, such as ASP/HTML application instances. A client WWW browser posts an HTTP request to a WWW server for an ASP page. The request is passed to the ASP engine which executes the code contained in the ASP page generating output static HTML code, which is transferred to the client WWW browser for display. The ASP page may itself contain directives which may generate static HTML code specific to the WWW browser that issued the request (e.g., Netscape Navigator, Microsoft Internet Explorer, etc). Further, the ASP page may generate simple JavaScript code which has been previously written and stored at the server. The ASP engine, thus, contains a simple ABE implementation which can perform elementary tasks, such as examining the platform of the client, and retrieving static HTML and JavaScript code from a repository depending on the client request.

This common example, however, exhibits an almost total lack of dynamicity. The static HTML code and the JavaScript code must be previously generated almost to entirety. This is due to the absence of ADR and AIRR modules and their associated interfaces, which allow flexible and dynamic code generation. It would be difficult to upgrade or modify said Web application because in every modification instance, the actual ASP code must be dealt with. In cases where the logic code is intermingled with interface code, this may become an extremely difficult enterprise. Hence the further, obvious advantages of using the ALE model, in which all functionality is divided into several operationally independent modules, and where changes may be readily made.

If the complete ALE model is implemented, the ABE receives the HTTP request from the client Web browser. Next, it communicates with the ADR from which it retrieves complete structural and functional descriptors of the application. These include interface structure (such as module, option and content structure) and logical and functional information (such as functionality associated with each option and suboption content described, for instance, in operational pseudocode). Next, the ABE communicates with the AIRR to obtain implementation specifics. In the first place, HTML code must be generated. Although there are standards for HTML code, every client browser interprets it in its own manner. Thus, depending on the specific browser that posted the request, the AIRR must provide browser-supported HTML code which implements the requested interface. Similarly, different browsers may support different types of executable or interpretable scripting, such as Visual Basic Script and JavaScript, or both. Thus, the AIRR must provide browser-supported script code.

To take full advantage of the power of the ALE model, which comprises the preferred embodiment of the present invention, client requests may ask for on-the-fly generation of code, specifically client-executable or client-interpretable code. When a client posts a request, the ALE consults the ADR for functional and operational implementation of the requested application. The ADR contains both generic and detailed functional logical descriptors coded inside the repository.

In case the ADR does not implement all logical descriptors required to fulfill the client application request, the ALE may either deliver an error message to the client saying that the requested application cannot be fully built, or deliver a warning message to the client saying that the requested application cannot be fully built and continue to build a partial application including only the available functional modules.

The preferred embodiment of this invention, following the example of FIG. 2B, comprises a client-browser (i.e., Microsoft Internet Explorer) which posts an HTTP request to an ASP through a Web server (i.e., Microsoft Internet Information Service). The request is passed to the ALE process running on the server. The structure of the request specifies the application and the type of functionality being requested. The modules, options, suboptions and content are included in the ADR in the form of a descriptor database. The output of the ALE in response to the request comprises static or dynamic HTML code with embedded, dynamically-created VBScript or JavaScript which is executed or interpreted at the client and which generates static or dynamic HTML code. Whenever application functionality needs to be upgraded, only expansion to the information contained in the ADR is necessary. For example, a "Reports" option may be added to the Access Control module which implements user access report generation. Under this option, additional suboptions are appended, including "Visitor Access Reports", "User Access Reports", etc., each containing specific functionality content.

Figure 4:
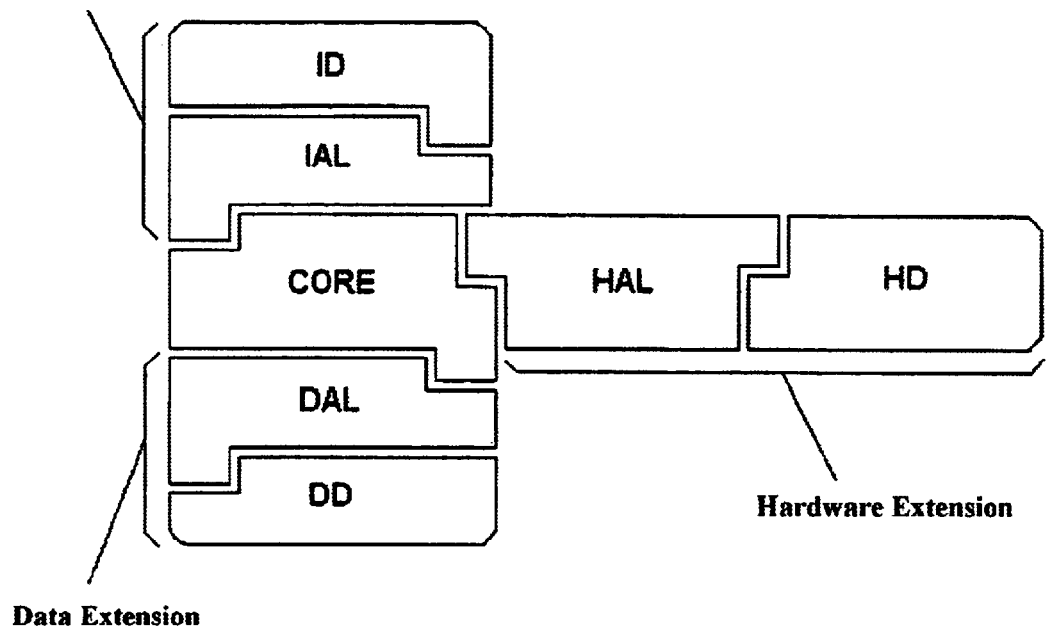
FIG. 4 illustrates the MAASA architecture.

The Application Logic Engine model can be easily integrated into other open software component architecture models, such as the Multidimensional Advanced Adaptive Software Architecture (MAASA, shown in FIG. 4), i.e., an open, modular and highly extensible software architecture described in our copending application. When ALE is integrated into MAASA, its parts remain logically separated and may interact directly, as is desired in the modular ALE model. ALE"s implementation end, including AIRI and AIRR, are implemented by MMSA"s ID. MAASA"s ID also partly implements ALE"s ABE, the part that communicates with the AIRI. The other half of ALE"s ABE, i.e., that which communicates with ADI, is implemented by MAASA"s IAL. Next, ALE"s ADI is implemented by MAASA"s DAL and DD, for which MAASA"s CORE serves as link between ALE"s ADI and ALE"s ABE. Finally, the ADR is implemented by any type of data extension that MAASA"s DD connects to, which may be a database or any type of logical storage device.

Figure 5:
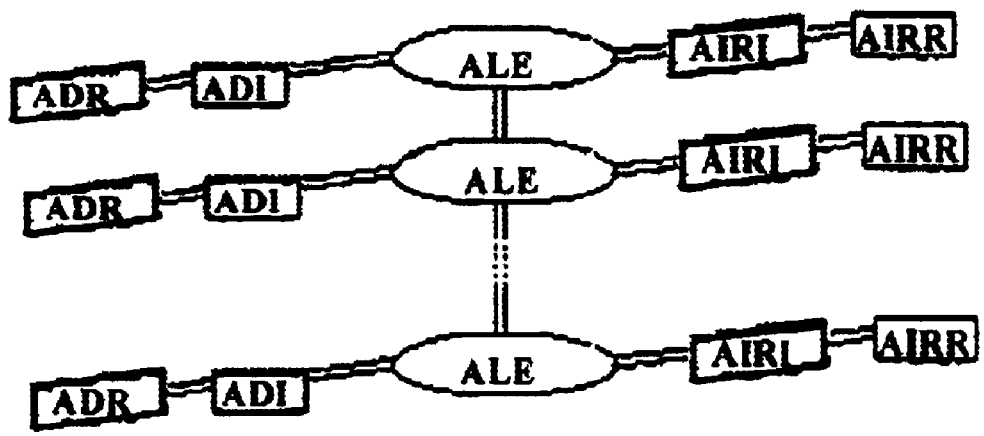
FIG. 5 illustrates how the present invention integrates with MAASA.

Several ALEs working in the same server/client system may communicate with each other to exchange information. These ALEs may be interconnected by an ALE Interconnection Pipe (ALEIP). The principal use of this interconnection is in cases where one type of application functionality is needed by several concurrent applications. For example, let there be two applications, namely, an Access Control system and an Alarm Control system, which execute concurrently, and which utilize equivalent functionality modules, i.e., both applications make use of a User Info module, where both access and alarm system users are stored and administered. By means of an ALEIP logical connection between the Access Control"s ALE and Alarm Control"s ALE, the functionality of the User Info module may be shared by both and thus avoid redundancy when desired. This is shown in FIG. 5.

CONCLUSION, RAMIFICATIONS AND SCOPE OF INVENTION

Thus, the reader will see that the present ALE model provides a comprehensive and readily extensible method for the dynamic generation of client application code at the server side.

While our above description contains many specificities, these should not be construed as limitations to the scope of the invention, but rather as an exemplification of one preferred embodiment thereof. Obviously, modifications and alterations will occur to others upon a reading and understanding of this specification such as, for example, the structure of an application may have more to it than just functional modules, options, suboptions and content organized in a hierarchical structure. Further, the model allows that several different ALE models running on different servers may share their own resources with other servers to reduce redundancy or increase performance, when desired.

The description above is intended, however, to include all such modifications and alterations insofar as they come within the scope of the appended claims or the equivalents thereof.

What is claimed is:

1. A method for a novel model for dynamic server-side generation of computer program code which can be executed at the client machine, the method comprising the steps of:

having an application consisting of three main sections, which subdivide the application into layers of functionality, the modules section, the options section and the content section;

having an application logic engine;

having a plurality of server and client computing means; and having the following connected components:
- i) an application building engine that functions as a core arbiter that controls and directs the construction of applications and serves as link between all application logic engine modules and other parts of the system;
- ii) an application descriptor repository that serves as a data repository that contains details about the application structure, including its modules, options, suboptions and content;
- iii) an application descriptor Interface that interfaces and acts as an abstraction layer between the application building engine and the application descriptor repository;
- iv) an application implementation reference repository is a data repository that contains client-specific implementation details of an application;
- v) an application Implementation reference interface that interfaces the application implementation reference repository and application building engine; and
- vi) an application logic engine interconnection pipe which interconnects a plurality of application logic engines.

2. A method for a novel model for dynamic server-side generation of computer program code which can be executed at the client machine, the method comprising the steps of:
- having an application consisting of three main sections, which subdivide the application into layers of functionality, the modules section, the options section and the content section;
- having an application logic engine;
- having a plurality of server and client computing means:
  - posting of a request from a client means to a server means;
  - examining the request by the server means;
  - passing the request to the application logic engine on the server means;
  - having said request contain an application identifier and functionality information;
  - having said application identifier referring to the type of service in the request;
  - having said server implement required functionality in a client-specific language and fulfill the request;
  - retrieving all application structure details including modules, options and suboptions from a data repository;
  - retrieving the required platform and environment information that implements the required functionality;
  - interfacing the application structures and required functionality; and
  - delivering the finished application or an error message if application does not implement all logical descriptors required by the client means application request.

3. A computer program product for a novel model for dynamic server-side generation of computer program code which can be executed at the client machine, the computer program product comprising a computer usable medium having computer readable program code thereon, including:
- computer code for having an application consisting of three main sections, which subdivide the application into layers of functionality, the modules section, the options section and the content section;
- computer code for having an application logic engine; having a plurality of server and client computing means; and having said logic engine having the following connected components:
  - i) an application building engine that functions as a core arbiter that controls and directs the construction of applications and serves as link between all application logic engine modules and other parts of the system;
  - ii) an application descriptor repository that serves as a data repository that contains details about the application structure, including its modules, options, suboptions and content;
  - iii) an application descriptor interface that interfaces and acts as an abstraction layer between the application building engine and the application descriptor repository;
  - iv) an application implementation reference repository is a data repository that contains client-specific implementation details of an application;
  - v) an application implementation reference interface that interfaces the application implementation reference repository and application building engine; and
  - vi) an application logic engine interconnection pipe which interconnects a plurality of application logic engines.

4. A computer program product used to add a new terminal device to a system, the computer program product comprising a computer usable medium having computer readable program code thereon, including:
- computer code for having an application consisting of three main sections, which subdivide the application into layers of functionality, the modules section, the options section and the content section;
- computer code for having an application logic engine; having a plurality of server and client computing means:
  - posting of a request from a client means to a server means;
  - examining the request by the server means;
  - passing the request to the application logic engine on the server means;
  - having said request contain an application identifier and functionality information;
  - having said application identifier referring to the type of service in the request;
  - having said server implement required functionality in a client-specific language and fulfill the request;
  - retrieving all application structure details including modules, options and suboptions from a data repository;
  - retrieving the required platform and environment information that implements the required functionality;
  - interfacing the application structures and required functionality; and
  - delivering the finished application or an error message if application does not implement all logical descriptors required by the client means application request.

* * * * *